United States Patent Office 3,096,756
Patented July 9, 1963

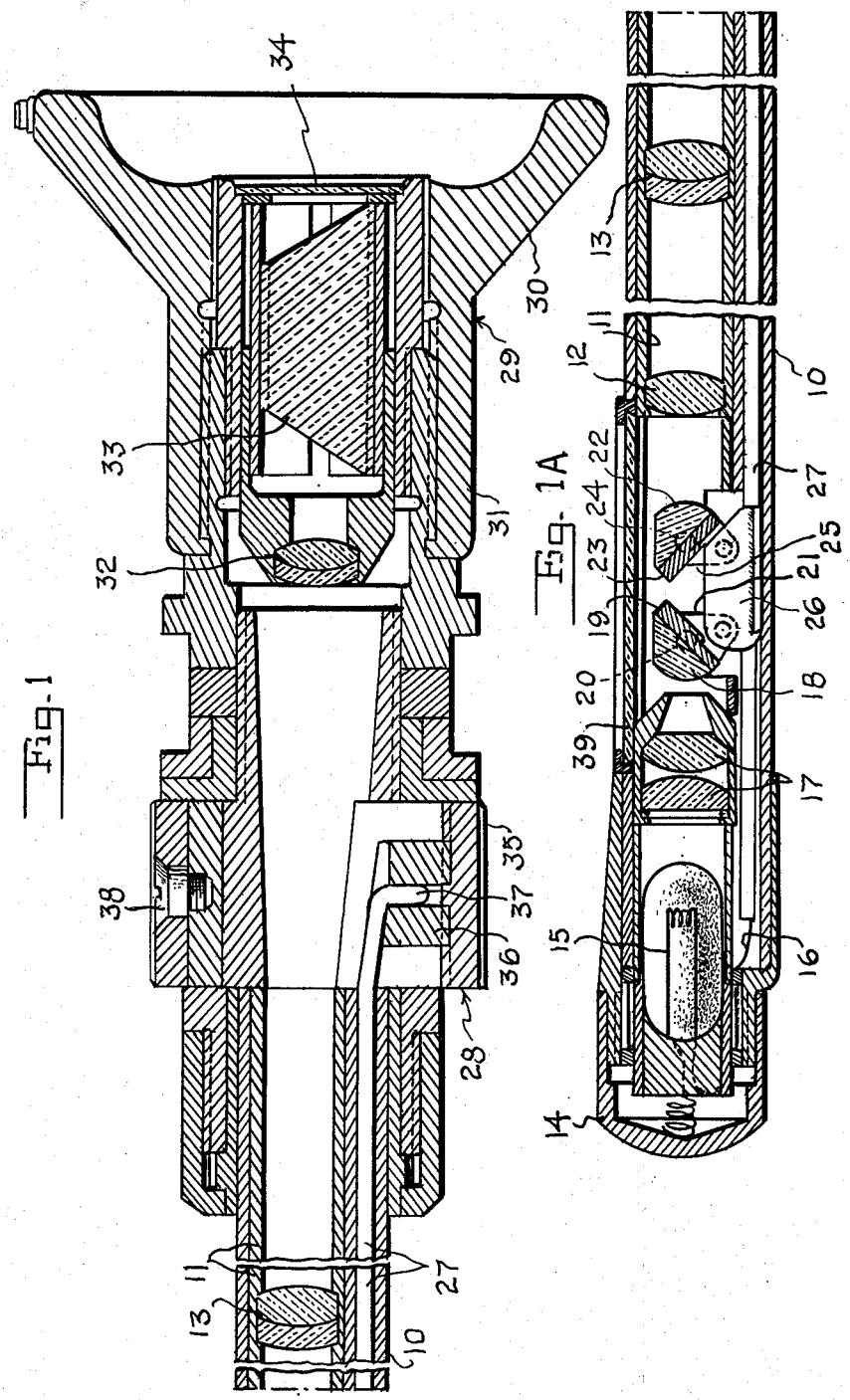

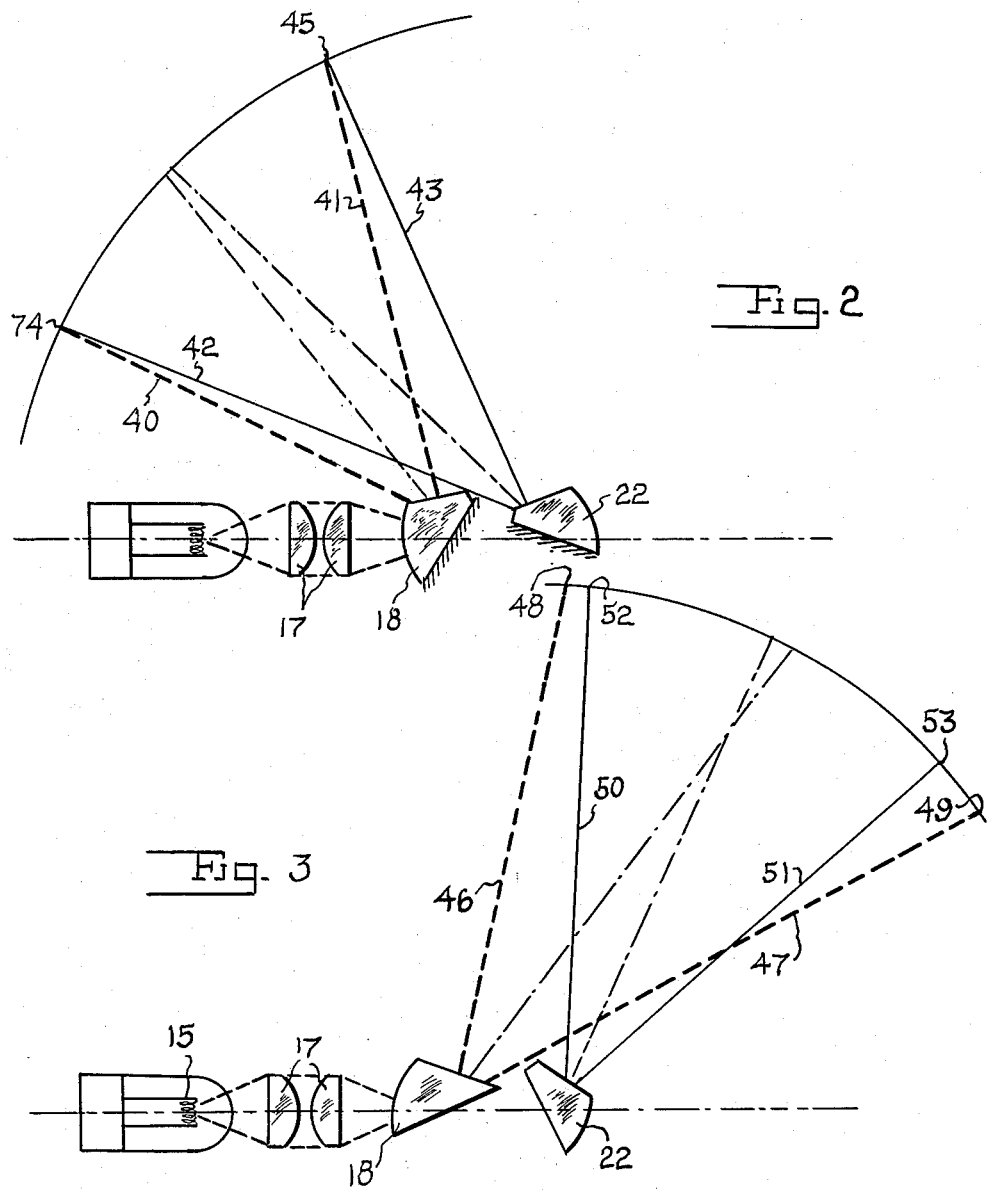

3,096,756
OPTICAL BRONCHOSCOPE
Eliasar Borisovich Rosenfeld, Kirova ulitsa 14/2, Apt. 3; Tamara Nikolaevna Miagkich, Tverskoi Blvd. 6, Apt. 10; Maria Nikolaevna Viliam-Vilmont, Vs. Vishnevsky ulitsa 10, Apt. 45; Eugene Michaelivich Osse, Novo-Basmannaja ulitsa 33, Apt. 3; and Alexander Vasilievich Plotnikov, Krasnoarmjeskaja ulitsa 82, Apt. 39, all of Moscow, U.S.S.R.
Filed July 22, 1959, Ser. No. 846,766
3 Claims. (Cl. 128—6)

This invention relates to medical instruments and more particularly to an optical bronchoscope specifically designed for the examination of the bronchi and the branches thereof.

Heretofore numerous types of bronchoscopes have been developed and utilized and the problems encountered in designing instruments of this type are somewhat difficult to solve, in that an elongated tube of relatively small diameter must be provided in order to permit insertion of the same to a position where the bronchi may be examined, as a consequence of which there is, of necessity, a relatively small field of view and the perspective is materially distorted. In order to adequately examine the bronchial branches it is necessary to change the angle of observation of the bronchoscope and heretofore this result has been accomplished by providing a set of tubes in which the angle of observation varies and in order to change such angle of observation it is necessary to remove the bronchoscope and change the optical tubes thereby prolonging the operation with consequent additional discomfort to the patient and furthermore, this type of instrument does not provide for minute variations in the angle of observation and if it so happens that none of the tubes at hand provide exactly the desired angle of observation, the examination cannot be wholly successful.

It is accordingly an object of the invention to provide an optical bronchoscope requiring only a single tube and in which the bronchoscope may be inserted and provide complete examination of the bronchi and all branches thereof.

A further object of the invention is the provision of an optical bronchoscope in which the angle of observation is infinitely variable within the limits of the instrument.

A still further object of the invention is the provision of an optical bronchoscope in which the angle of observation is infinitely variable within the limits of the instrument and in which the field of observation is adequately illuminated at all times, the beam of light providing such illumination also being infinitely variable in accordance with the variation in the angle of observation.

Another object of the invention is the provision of an optical bronchoscope including means for infinitely varying the angle of observation, as well as illuminating means which is infinitely variable in order to continuously illuminate the field of observation, regardless of the angle of such observation, there being provided means at the eye piece end of the instrument to facilitate adjustment of the angle of observation without removing the instrument from the patient.

Further objects and advantages of the invention will be apparent from the following description taken in conjunction with the accompanying drawing wherein:

FIG. 1 is a longitudinal sectional view showing the eye piece end, the adjusting mechanism and a portion of the tube of an optical bronchoscope constructed in accordance with this invention;

FIG. 1a a continuation of FIG. 1 and showing the end of the tube remote from the eye piece and including the details of the illuminating means, the means for varying the angle of illumination and the means for varying the angle of observation;

FIG. 2 a diagrammatic view showing the position of certain of the elements of the instrument for one angle of observation and for illuminating the field of view at this angle; and FIG. 3 a diagrammatic view similar to FIG. 2, but showing a different angle of observation in the manner of illuminating the field of view at this angle.

With continued reference to the drawing, there is shown in FIGS. 1 and 1a an optical bronchoscope constructed in accordance with this invention and which comprises an elongated tube 10 within which are mounted by means of mounting tubes 11 a plurality of collecting lenses 12 and a plurality of lenses providing inverting systems 13.

The tube 10 terminates at the end to be inserted into the patient in a suitable removable cap 14 which provides access to a light source in the form of an electric lamp 15 mounted within the tube and suitable means including a conductor 16 within the tube 10 provides means for supplying electrical energy to the lamp 15. Mounted within the tube 10 inwardly of the lamp 15 is a condensing lens system 17 which serves to direct rays of light from the lamp 15 to a reflecting prism 18. Prism 18 is carried by a mount 19 which is pivotally mounted within the tube 10 at 20 for movement about a transverse axis. The mount 19 is provided with a projecting ear 21, the purpose of which will be presently described.

Also mounted within the tube 10 and axially spaced inwardly from the prism 18 is an objective reflecting prism 22 carried by a mount 23 pivotally mounted within the tube 10 at 24 for movement about a transverse axis. The mount 23 is provided with an ear 25 and ear 25 is pivotally connected to ear 21 by a link 26. Connected to the link 26 and extending longitudinally within the tube 10 is an actuating rod 27.

The tube 10 terminates at the end opposite the cap 14 in a prism adjusting mechanism 28 and secured to such mechanism outwardly thereof is an eye piece assembly 29. The eye piece assembly 29 includes an eye cup 30 having a sleeve 31 for securing the same to the instrument and within the sleeve 31 are mounted an eye piece lens 32, a prism 33 and a transparent closure member 34.

The prism adjusting mechanism 28 includes a rotatable nut 35 fixed against axial movement and threadedly engaged within the nut 35 and fixed against rotational movement is a bushing 36. The actuating rod 27 is secured at the end 37 thereof to the bushing 36. Rotational movement of the nut 35 is limited by means of a stop screw 38 provided therein which permits movement of the nut 35 within the desired limits. Rotation of the nut 35 serves to move the bushing 36 longitudinally which in turn also moves the actuating rod 27 longitudinally and through the link 26 pivotally moves the prisms 18 and 22 about the pivotal mountings 20 and 24. With particular reference to FIG. 1a, it is to be noted that there is provided a viewing window 39 in the side of the tube 10 adjacent the prisms 18 and 22 and the window 39 permits the projection of light rays therethrough from the prism 18 and the reception of reflected light rays by the prism 22.

The operation of the optical bronchoscope of this invention is shown diagrammatically in FIGS. 2 and 3 and in FIG. 2 the prism 18 is adjusted in a manner to project the beam of light between the dotted lines 40 and 41 and at the same time, and automatically by reason of the connecting link 26, the objective prism 22 is adjusted to provide for reception of reflected light rays between the solid lines 42 and 43 for observation of an area between points 44 and 45 which coincide with the illuminated area.

In a similar manner, FIG. 3 shows diagrammatically the operation of the instrument with the prisms 18 and 22 adjusted to quite a different angle and in which light rays are projected between the dotted lines 46 and 47 to illuminate an area between the points 48 and 49 and the prism 22 receives reflected light rays between the solid lines 50 and 51 which permits observation of the area between points 52 and 53 which is clearly within the illuminated area.

It will thus be seen that by the above described invention there has been provided an optical bronchoscope which may be conveniently adjusted without removing the same from the patient for the purpose of changing the angle of observation to permit examination of the main bronchi and also the bronchial tubes branching off therefrom in different directions and in which the area under observation is illuminated and the angle of observation and the illuminating means being adjusted simultaneously to provide for rapid and efficient bronchial examination. Thus, one single instrument provides for suitable bronchial examination without the necessity for removing the instrument from the patient to change the angle of observation and thereafter, reinsert the instrument within the patient.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An optical bronchoscope, comprising a hollow elongated housing, illuminating means at one end of said housing, a pair of optical elements mounted for pivotal movement in fixed relationship relative to the housing along a generally lengthwise path with respect thereto, each of said optical elements including reflective means, one of said optical elements projecting light waves emitted from said illuminating means outwardly, the other of said optical elements receiving the image illuminated by said illuminating means, and reflecting the image toward the other end of said housing, and linkage means for moving said optical elements simultaneously to different pivotal positions.

2. An endoscopic instrument comprising a hollow elongated housing, illuminating means at one end of said housing, a pair of optical elements movably mounted in fixed relationship at said one end of the housing along a generally lengthwise path relative thereto, one of said optical elements adapted to reflect light waves emitting from said illuminating means, outwardly toward a general area, the other of said optical elements positioned to receive the reflected image illuminated thereby, and direct the image toward the other end of said housing, and linkage means for moving said optical elements to different areas.

3. An instrument according to claim 2, wherein said other end of the housing includes remote adjustment means for actuating said linkage means for moving the optical elements located at the one end of the housing to their different positions.

References Cited in the file of this patent

UNITED STATES PATENTS

| 598,787 | Kelling | Feb. 8, 1898 |
| 1,726,268 | Jahr | Aug. 27, 1929 |
| 2,899,856 | Shull | Aug. 18, 1959 |

FOREIGN PATENTS

| 526,643 | Germany | June 8, 1931 |